Nov. 18, 1941.  M. B. LUTTBEG  2,263,218
ACCORDION
Filed July 12, 1939   6 Sheets-Sheet 1

Inventor
Max B. Luttbeg
By William Hanna Att.

Nov. 18, 1941.   M. B. LUTTBEG   2,263,218
ACCORDION
Filed July 12, 1939   6 Sheets-Sheet 2

Inventor
Max B. Luttbeg
By William James Atty.

Nov. 18, 1941.    M. B. LUTTBEG    2,263,218
ACCORDION
Filed July 12, 1939    6 Sheets-Sheet 5

Inventor
Max B. Luttbeg
By William Jannus
Atty.

Nov. 18, 1941.  M. B. LUTTBEG  2,263,218
ACCORDION
Filed July 12, 1939   6 Sheets-Sheet 6

Inventor
Max B. Luttbeg
By William Fanne Atty.

Patented Nov. 18, 1941

2,263,218

UNITED STATES PATENT OFFICE 2,263,218

ACCORDION

Max B. Luttbeg, St. Louis, Mo.

Application July 12, 1939, Serial No. 283,929

11 Claims. (Cl. 84—376)

This invention relates generally to accordions and more particularly to the keyboard thereof.

As is well known in the art, the treble keyboard section of an accordion is operated by the right hand and the bass section keyboard by the left hand of the player. Heretofore, the keyboard of the bass section of the accordion has been made with a large number of keys, the usual number being one hundred twenty keys. In the 120 bass keyboard, forty keys, or two rows, are low single note basses, but of these forty keys there are only twelve different tones or one complete octave of single note basses and the rest (twenty-eight) of the forty keys are repeaters.

The balance of the one hundred twenty keys, or eighty keys, are chords, that is, each key selects a chord of three or four notes. However, of these eighty keys only forty-eight play different chord combinations and the rest (thirty-two) are repeaters. Consequently, the accordion is limited to a predetermined number of chords, and the formation of various chords as called for in musical compositions is impossible and it is necessary to transpose the musical score to suit the capacity of the bass section of the instrument. Furthermore, the large number of buttons in the bass keyboard was confusing to the beginner. It also required a large number of clapper operating mechanisms, since many of the buttons or keys were repeaters, to enable the operation of a clapper from a number of different positions on the keyboard.

One of the objects of the invention is to provide a novel arrangement of the bass keyboard whereby all thirty-two keys are single notes ranging chromatically from low C to high G above high C, so that any chord combination written can be obtained by depressing simultaneously such keys as will form the desired chord, and to play chords in inverted or other positions heretofore not possible in the present types of bass keyboards.

Another object of the invention is to reduce the number of bass keys to thirty-two original keys and four repeaters and to arrange said keys in a novel and compact manner whereby various compositions can be played as originally written and the keys can be operated with ease without shifting the hand from one end of the keyboard to the other.

Another object of the invention is to provide four repeater keys or buttons arranged to the left side of the group of primary keys, these repeater keys corresponding to the primary keys located at the righthand side of the keyboard whereby the little finger of the left hand can reach all fundamental basses before any chord beat.

Another object of the invention is to arrange the keys of the keyboard in a plurality of rows disposed longitudinally and transversely of the keyboard, said transverse rows being disposed diagonally upwardly from left to right, whereby said keys can be arranged closely together to permit ready manipulation thereof with minimum shifting of the player's hand and without interfering with each other, and whereby any two of the diagonally adjacent keys can be played with one finger.

A further object of the invention is to provide a bass keyboard for accordions adapted to play perfect chromatic scale without skipping any octave whereby the volume of the twelve lowest bass notes is made voluminous by automatically taking in the middle octave and not the higher notes.

With these and other objects in view, my invention consists in certain novel features of construction and arrangement of parts, hereinafter more fully described and claimed, and illustrated in the accompanying drawings, in which—

Figure 1:
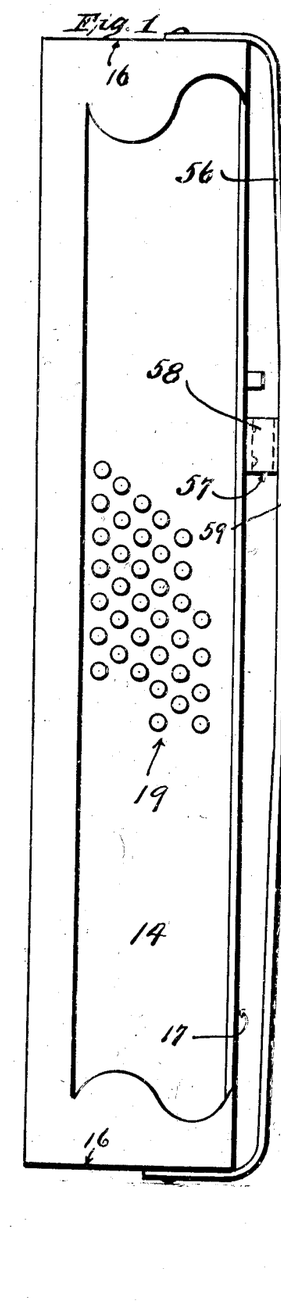
Figure 1 is a front elevation of a bass keyboard of an accordion.
Figure 2:
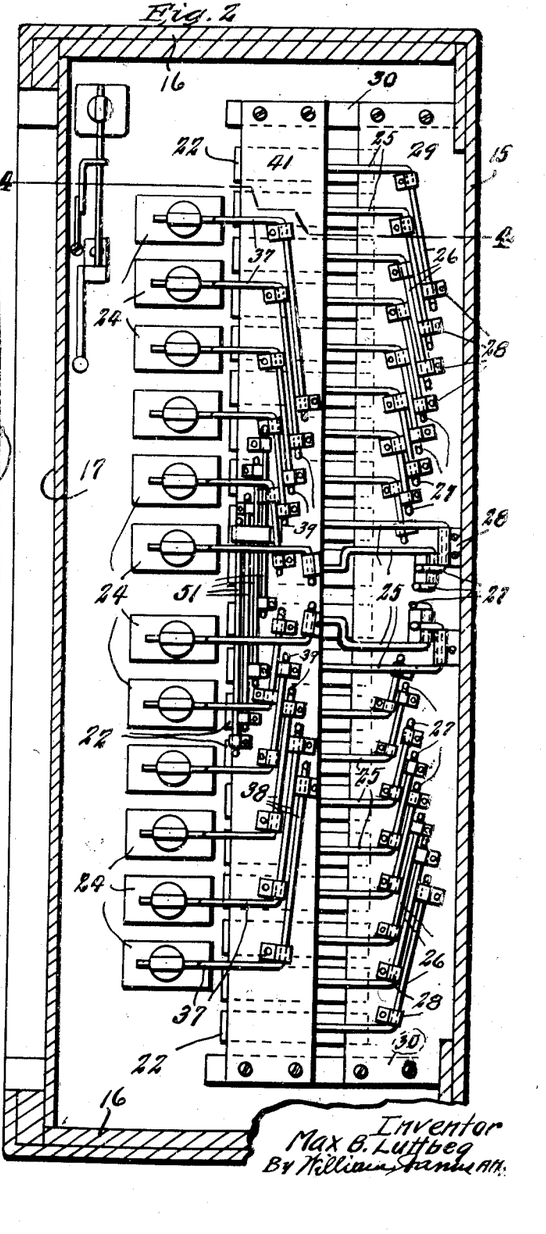
Figure 2 is a horizontal cross section through the same.
Figure 3:
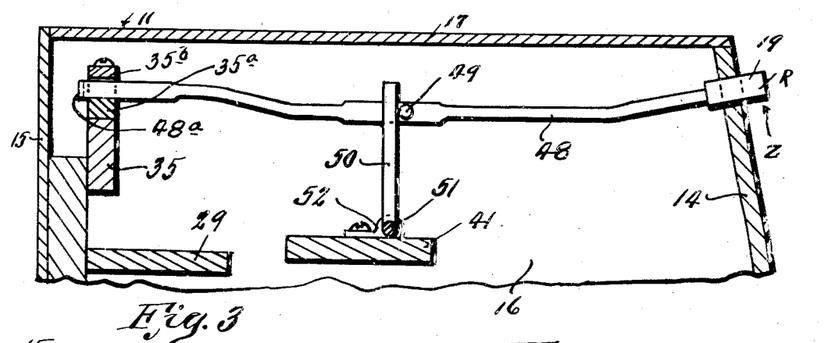
Figure 3 is an enlarged vertical cross section taken on line 3—3 of Figure 7.
Figures 4, 5, 17:
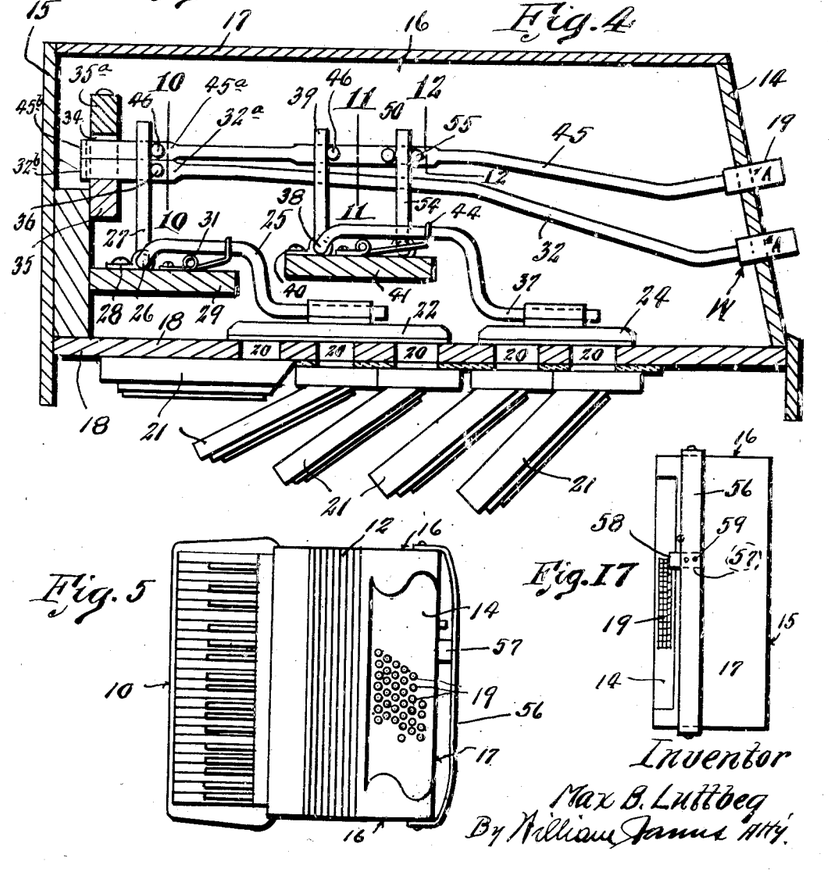
Figure 4 is an enlarged vertical cross section taken on line 4—4 of Figure 2.
Figure 5 is a front elevational view of an accordion equipped with my improved keyboard.
Figure 17 is a side elevation of the accordion shown in Figure 5.
Figures 6, 7, 8:
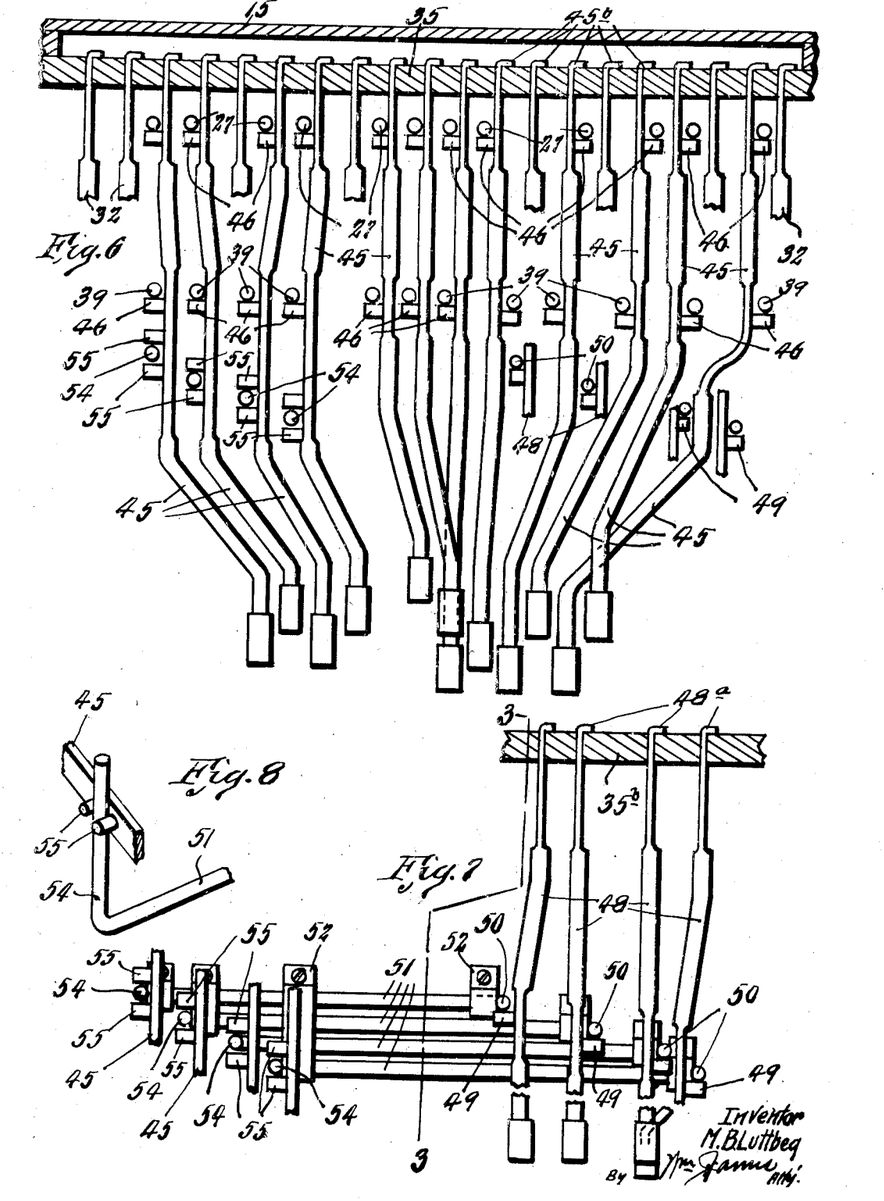
Figure 6 is an enlarged fragmental horizontal cross section showing one set of keys and their connections.
Figure 7 is a similar view showing the repeater keys and their connections.
Figure 8 is a perspective detail view showing a connection between one of the repeater cranks and one of the key rods.

Referring by numerals to the accompanying drawings, 10 indicates a treble section of an accordion, 11 a bass section, and 12 a bellows. The treble section is provided with the usual keyboard and can be of usual construction. The bass section 11 is box-shaped, consisting of a front wall 14, a rear wall 15, end wall 16, top or outer face wall 17, and an inner wall or sound board 18.

The front wall 14 is inclined inwardly from the bellows or sound board 18 toward the opposite wall 15 and contains buttons or keys 19. By slanting the walls 14 keys 19 can be more easily reached and operated. There are thirty-six buttons of which four are repeaters.

Figure 13:
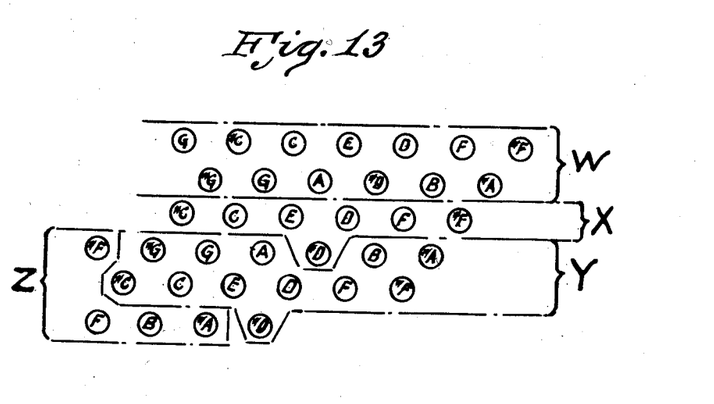
Figure 13 is a front view of the keys separated in their respective groups.

The keys 19 are disposed centrally or intermediate the ends 16 and are arranged in six longitudinal rows. The keys of the longitudinal rows are so disposed with respect to the keys of the other rows that they form seven transverse diagonal rows. This diagonal arrangement of the keys 19 permit closer spacing thereof relatively to each other so that a large number of said keys can be operated without shifting the hand and also permits the simultaneous operation of two adjacent diagonal keys by one finger. As shown in Figure 13, the keys 19 are arranged in four groups marked W, X, Y and Z.

The first group W takes in the two longitudinal rows nearest the bellows side of the keyboard and farthest from the face plate or wall 17. These keys represent the highest tones and form the greater part of the chord. They are as follows:

First row: G, C-sharp, C, E, D, F, and F-sharp.
Second row: G-sharp, G, A, D-sharp, B, and A-sharp.

The second group X consists of the third longitudinal row and one key (the fifth) of the fourth row. These keys represent tones nearest to the lowest and are used for the inverted chords and also for the prolongation of the basses. They are as follows:

C-sharp, C, E, D-sharp, D, F, and F-sharp

The third group Y consists of the fourth and fifth longitudinal rows of keys and one key of the sixth row. They represent the low fundamental basses and are as follows:

Fourth row: G-sharp, G, A, B, and A-sharp.
Fifth row: C-sharp, C, E, D-sharp, D, F natural and F-sharp.

The last group Z are the repeater keys, and they are counterparts of the last four keys of group Y. They are as follows:

F-sharp, F, B, and A-sharp

Of these keys, F-sharp is disposed in line with the fourth row nearest to G-sharp of group Y, and F, D, and A-sharp are disposed in the last or sixth longitudinal row in front of D-sharp of group Y.

The provision of these repeater keys at the left or opposite side of the original keys permits the keyboard to be so arranged that the little finger of the left hand can reach all fundamental basses before any chord beat. Thus, as will be noticed, every one of the low basses is disposed to the left of the keyboard and the player can make any first beat with the little finger.

In playing C major scale, in bass clef, start with lowest C (below the staff) with the little finger, the next note D is played with the second finger, the note E with the third finger, note F with first or index finger. The next note G is played with the little finger, A with the third finger, B with the first or index finger, C with the little or fourth finger, D with the second finger, E with the third finger, F with the first or index finger, G with the fourth or little finger, A with the third finger, B with the first or index finger, and C, the highest note, with the little finger.

Any other scale known in music can be played on this accordion in the same manner as described above. The player is enabled to play with ease due to the simplicity of fingering.

The soundboard 18 has formed therein a plurality of apertures 20 arranged in five longitudinal rows or groups. Disposed on the bellows side of this soundboard are five reed trays 21, each overlying one row of apertures 20. These trays are inclined from perpendicular to the soundboard and are disposed at various degrees, one of them being disposed horizontally or lying flat against the soundboard. Each tray contains a reed chamber communicating with the respective aperture and a pair of usual reeds.

Figure 9:
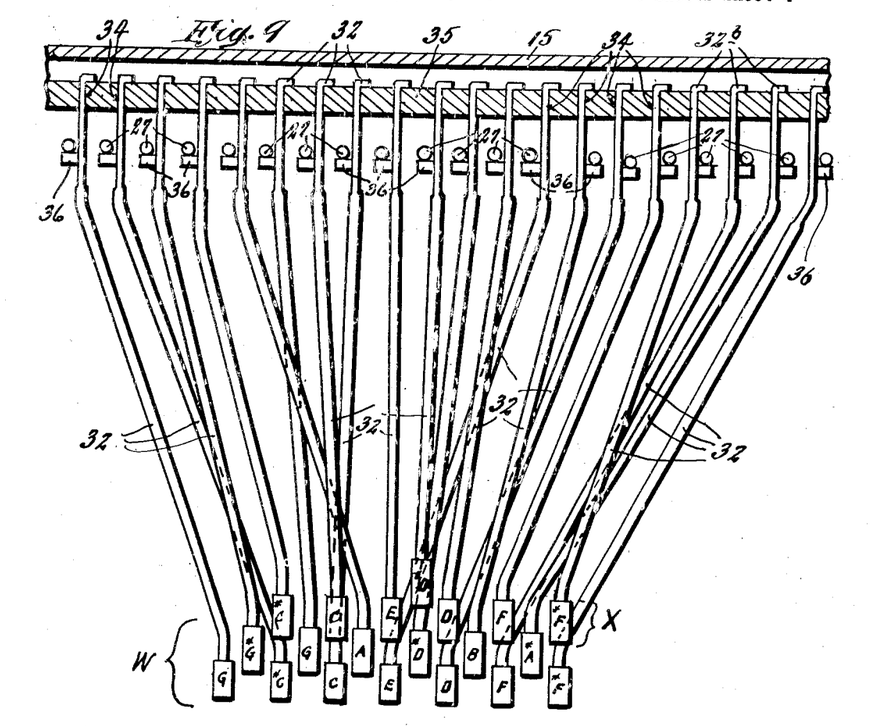
Figure 9 is a fragmental horizontal cross section showing another set of keys and their operating connections.
Figure 10:
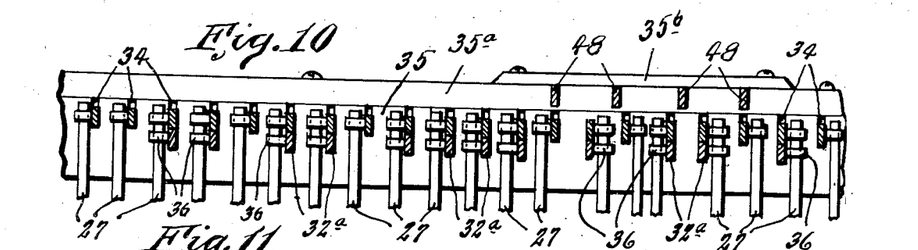
Figure 10 is a vertical cross section taken on line 10—10 of Figure 4.
Figures 11, 12:
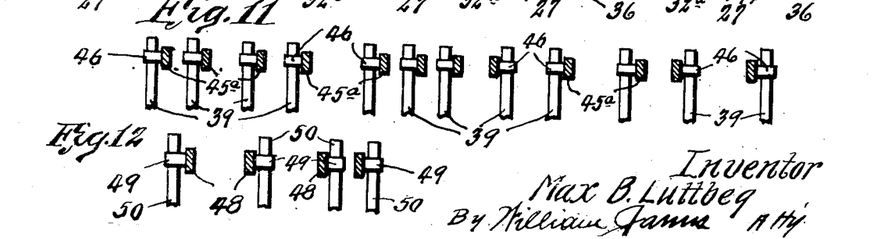
Figure 11 is a vertical cross section taken on line 11—11 of Figure 4.
Figure 12 is a vertical cross section taken on line 12—12 of Figure 4.

Disposed on the outer side of the soundboard within the box-shaped section 11 are two rows of clappers or valves 22 and 24. The valves 22 control the first three rows of apertures or the chord reeds and the valves or clappers 24 control the last two rows or the fundamental bass reeds. Each clapper 22 is carried by the end of an arm 25 of a crank 26, the other arm of said crank extending upwardly, as indicated at 27. Each crank 26 is pivotally mounted by means of one or more bearings 28 on a horizontally disposed shelf 29. This shelf is disposed adjacent to the rear wall 17 and is spaced from the soundboard and from the clappers 22 by end pieces 30. Arm 25 of each bell crank 26 extends transversely and forwardly past the forward edge of the shelf 29 and is bent downwardly and then forwardly and is connected at its end to the respective clapper 22. A coiled spring 31 has one end engaging arm 25 of each crank 26 and the other end is fixed to the shelf 29. Thus the spring yieldably holds the clapper in closed position and also serves to hold the parts associated with the crank 26 in normal or inoperative position. The arm 27 of each crank 26 is disposed substantially in a vertical plane near the rear wall 15 and said arms 27 are suitably spaced from each other, as shown in Figures 9 and 10.

A rod 32 extends substantially horizontally between the rear wall 15 and the front wall 14. The rear end of each rod 32 is flattened in vertical plane, as indicated at 32a, and is slidably mounted in a vertically disposed slot 34 formed in a guide 35. The latter is fixed to and spaced from the rear wall 15 and the extreme end of each rod 32 extends past said guide and is bent laterally, as indicated at 32b, to prevent excessive forward movement of said rod. Each rod 32 is disposed adjacent to one arm 27 and has fixed on its flattened portion 32a a pin 36 which extends horizontally and transversely and is disposed in front of the respective arm 27 so that the latter bears thereagainst. The forward ends of rods 32 are fixed to the keys 19 of the groups W and X.

Figure 15:
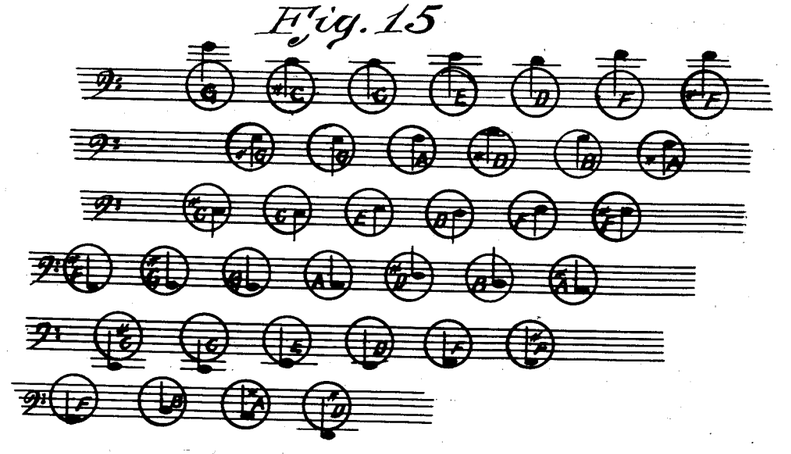
Figure 15 is a diagram explaining the keyboard arrangement in musical terms.

Thus key marked G in the first row of group W operates the bottom clapper marked G in Figure 15 and key marked F-sharp in said first row operates the topmost clapper 22 marked F-sharp.

Key marked G-sharp in the second row of group W operates the second to bottom clapper marked G-sharp and key marked A-sharp operates the third from top clapper marked A-sharp in Figure 15.

Key marked C-sharp in the second group X operates clapper fourth from bottom and marked C-sharp and key marked F-sharp of said group operates clapper fourth from top marked correspondingly.

Key marked D-sharp (located in fourth row from top) operates clapper tenth from top.

The clappers 24 are fixed to the horizontal ends of arms 37 of cranks 38, the other arms 39 of which are disposed vertically. Cranks 38 are pivotally mounted by means of bearings 40 on a horizontal shelf 41 which is disposed in front of and parallel with shelf 29. It is disposed on a horizontal plane slightly above said shelf 29 and is held above clappers 22 by spacers or blocks 42. A coiled spring 44 engages at one end each arm 37 and is anchored at the other to shelf 49 and serves to hold the clapper 24 in a closed position.

A plurality of rods 45 extend between rear wall 15 and front wall 14. The rear ends of the rods are flattened, as at 45a, and are slidably mounted in extensions of slots 34 of guide 35. The projecting ends of said portions 45a are bent laterally to form stops, as indicated at 45b. The forward ends of rods 45 are fixed to the respective keys or buttons 19 of group Y. Each rod 45 has fixed to its flattened portion 45a a short horizontal pin 46 which lies in front of the vertical arm 27 of one of the cranks 26 parallel with and spaced from pin 36, as shown in Figure 10.

The rods 45 are bent or shaped so that each rod passes adjacent to the vertical arm 39 of one of the cranks 38. Preferably this portion of the rod is flattened in a vertical plane and has secured thereto a horizontal pin 46 which extends across and in front of the respective arm 39. Thus when one of the keys in group Y is pressed one of the clappers 24 is operated and simultaneously a corresponding clapper 22 is also operated. Only the middle octave is used automatically to assist and build up the volume of the lower basses. The higher notes controlled by keys of group W are not used in conjunction with the low basses but are used for chords only.

Key marked G-sharp in the first row of group Y operates the lowermost clapper 24 and the second low clapper 22. Key marked A-sharp in said row operates the uppermost clapper 24 and the third from top clapper 22. Key marked C-sharp in the second row of group Y operates the second low clapper 24 and the fourth low clapper 22. Key marked F-sharp in said second row operates the second from top clapper 24 and the fourth from top clapper 22. Key marked D-sharp (located in the last row) operates clapper 24 sixth from top and clapper 22 tenth from top.

There are four repeater keys grouped under Z. These are repeaters or duplicates of the last four keys (B, A-sharp, F-sharp, and F) at the opposite ends of the two rows of group Z. This arrangement provides a keyboard in which the little finger of the left hand can reach all the fundamental basses. Extending between each repeater key and the rear guide 35 is a rod 48, the rear end of which is flattened and slidably mounted in said guide above the aforementioned rods. The rear end of this rod is bent as at 48a to limit the forward movement thereof. These rods 48 have no operative connections with any of the cranks 26 of the chord clappers 22 and no direct connections with the cranks 38 of the clappers 24.

Each rod 48 has fixed to it intermediate its ends a horizontally disposed pin 49 which extends in front of a vertical arm 50 of a crank 51. There are four cranks 51 pivotally mounted by means of bearings 52 on the shelf 41 adjacent to the front edge thereof. These cranks extend under and past rods 32 and 45 and their opposite ends terminate each in a vertical arm 54. Each of these arms 54 extends upwardly adjacent to each of the rods of keys B, A-sharp, F, and F-sharp. Each of these rods has fixed thereon a pair of spaced-apart horizontally disposed pins 55. These pins are disposed each on each side of one of the arms 54 so that each repeater mechanism and its corresponding clappers 22 and 24 operate in unison.

Thus when repeater key F is pressed, the corresponding crank 52 is actuated and through arm 54 bears against the rear pin 55 and actuates the push rod 45 of key F of group Y. When repeater key F-sharp is pressed, mechanism of key F-sharp of group Y is actuated. Similarly, repeater keys B and A-sharp operate the mechanism of the keys B and A-sharp of group Y.

Figure 14:
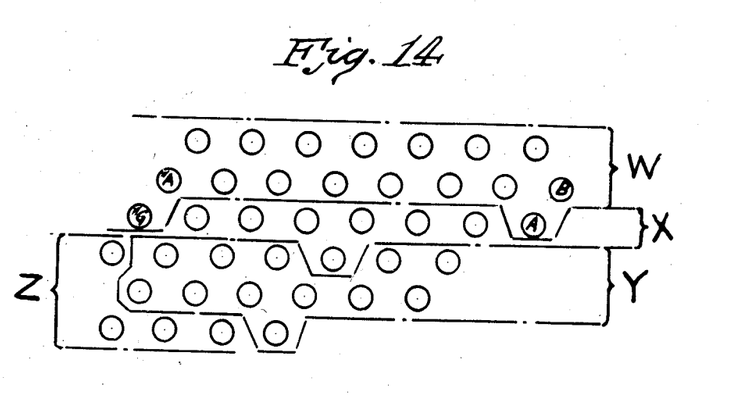
Figure 14 is a front view of a keyboard having thirty-six keys.

There are thirty-two keys and four repeaters in the present keyboard. If desired, four keys can be added to the thirty-two keys, thereby giving the instrument a range of three whole octaves, as shown in Figure 14. By adding these four keys, three octaves of actual notes are provided. This is desirable for advance players who may desire a three octave keyboard. The mechanism of these keys is arranged in the ends of the chord tier. Two of these keys (G sharp and A sharp) are at one side of the regular keyboard and are played by the little finger. The other two keys (A and B) are placed on the other side and are played by the index finger. This eliminates extra row of keys and provides for proper fingering. All four of these keys are in the high octave or W group.

Figure 16:
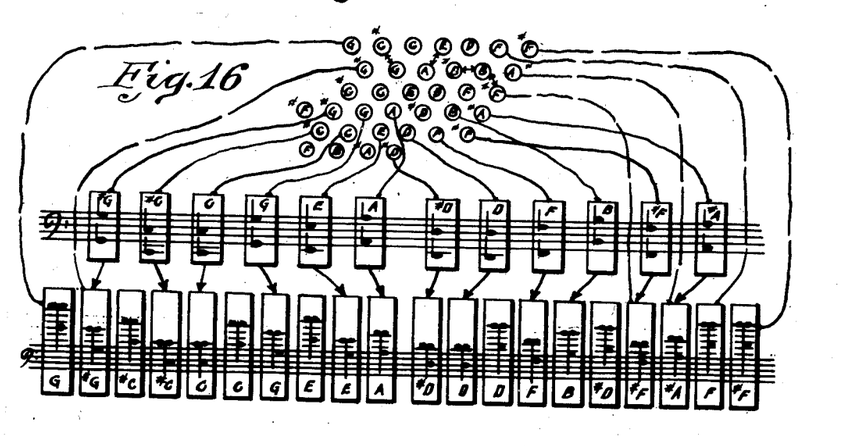
Figure 16 is a diagrammatic view showing the arrangement of the clappers and the keyboard and their relations with each other.

Figure 15 is a diagrammatic view explaining the arrangement of the keyboard in musical terms. This view explains the arrangement of the keyboard and shows the advantages over the old standard keyboard. Figure 16 shows diagrammatically the arrangement of the clappers and their corresponding musical tones.

It will be noted that by pressing any fundamental bass key or button, another clapper of the same name or note as the fundamental clapper is automatically raised up increasing the volume of the bass to five double reeds. This figure also shows the relation between the clappers and the respective keys and the playing relation between the bass reeds and the chord reeds. The chord section contains three sets of reeds on press and on draw. Two of these sets are in unison and the third set is one octave lower. However, this is optional as two sets tuned in unison can consist of two low octaves and the third set can be of high octave.

The "arpeggio" in "Poet and Peasant" is played on my accordion in the same manner as on the piano, starting with low D, using the third finger of the left hand, then playing the F sharp with the index finger, then playing A with the third finger, following then with high D above the staff with the second finger, then dropping to A again with the third finger, then to low F sharp with the first or index finger. To complete the full measure the above arpeggio is repeated.

Due to the fact that standard 120-bass accordions consist only of one octave of single basses, the high D is missing and the player has to drop to low D where he started from, thereby skipping a whole octave. Therefore, in playing on a standard accordion it is necessary to arrange such passages as arpeggio into chords.

Figure 17 is a side elevational view of the accordion shown in Figure 5 and shows the arrangement of the pull stray and the thumb strap. The pull strap 56 has its ends fastened to the ends of bass section or end wall 18 in the usual manner. A thumb strap 57 is disposed transversely of strap 56 adjacent to the upper end of the keys 19. The looped portion 58 of strap 57 extends toward the keyboard. One end of the thumb strap is fixed to the wall 17 of section 14 and the other end of said strap 57 is attached to strap 56, as shown at 59.

In playing the accordion, only the four fingers of the left hand are used, the thumb being inserted in the looped portion 58, thereby maintaining the hand in predetermined relation with the keyboard 19. The engagement of the thumb with the strap 57 serves to stabilize the hand and relieves the strain on the arm. However, it leaves the hand free to move over the keyboard with ease and assurance.

As before mentioned, all of the thirty-two keys of my instrument are single notes, ranging chromatically from low C to high G above high C, as shown in Figure 15, and any chord combination written in music can be obtained with my keyboard by operating simultaneously such keys as will form the chord desired. Also chords can be played in inverted and other positions. Continuous chromatic scale, the same as on a piano, can be played on my instrument. The scale starts near the person, that is, with the bottom row of group Y (Figure 13) and continues upward away from the player, thereby insuring easy fingering.

The higher notes on the keyboard are used for chords only and for single note formation.

The middle octave is used in arpeggio, in forming chords, and to help out the volume of the lower or fundamental basses. Thus the volume of the low or fundamental basses is rendered more voluminous. Any known chord can be formed with the use of the first three fingers, leaving the fourth or little finger free for the operation of the fundamental or low bass keys. The thumb is not used for operating the keys, but is hooked in the loop portion 58 of strap 57 and serves to steady the hand. The provision of the four repeater keys (group Z) permits the operation by the little finger of the four keys F, F-sharp, B, and B-sharp of group Y, while the other fingers are operating the keys located at the opposite end of the keyboard.

This method of arranging the keys and repeaters eliminates the jumping from low basses to the chords, and permits the little finger of the left hand to reach all fundamental or first beat basses before any chord beat.

The arrangement of the keys in close relation with each other in predetermined musical relation with each other permits the simultaneous operation of two adjacent keys with one finger so that three or four keys can be simultaneously operated by two fingers. This is illustrated in Figure 16. To play chord of A seventh consisting of four notes, finger No. 3 presses down G and C-sharp keys, joined by arrows in said figure, and finger No. 2 presses down keys marked A and E, also joined by arrows.

To play B major, first finger is placed on F sharp and B keys and second finger on D sharp, as indicated by arrows in said figure.

My keyboard is so arranged that in single note fingering any passage in music can be played or fingered without the necessity of fingering any two consecutive keys with the same finger, that is, a different finger is always available for the next key to be depressed. This is an important feature of my invention as only four fingers are used, whereas to accomplish this same thing on a piano keyboard the thumb has to be utilized.

On the one hundred twenty bass keyboard, the chord formations are limited and are obtained in only one position. It has only one octave of single note basses and in playing the left hand is required constantly to move up and down the keyboard. In my invention any chord written in music can be played on my accordion in several different positions, and any single note intervals can be fingered proficiently and simply on my keyboard.

My keyboard is easy to manipulate and the hand is not required to move up and down over the same.

While I have shown and described herein the preferred form of my invention, it is obvious that various changes in the construction and arrangement of parts of my accordion can be made and substituted for those herein disclosed without departing from the spirit of my invention.

I claim:

1. In an accordion, a bass section comprising a front wall, a plurality of button keys arranged in said wall in a series of six longitudinal rows and consisting of thirty-two chord keys and four repeat keys, the latter being disposed to the left of said wall and being counterparts of two keys on the extreme right of the second and third rows from the bottom, the keys of one row being disposed halfway of the keys of adjacent rows, whereby said keys are disposed in transversely diagonal rows and in close relation with each other, whereby any two diagonally adjacent keys can be pressed simultaneously by the same finger, said keys representing single notes arranged chromatically, whereby any third combination written in music can be played on the accordion by operating simultaneously such keys as will form the desired chord.

2. In an accordion, a bass section comprising a front wall, a plurality of button keys arranged in said wall in a series of six longitudinal rows and in a series of transversely diagonal rows, whereby said keys are arranged closely together and any one of said keys can be played by the four fingers of the player's left hand without shifting the latter, said keys consisting of thirty-two chord keys and four repeat keys, the latter being arranged at one end of said chord keys and being counterparts of four chord keys disposed at the opposite end of said chord keys, said chord keys representing single notes arranged chromatically, whereby continuous chromatic scale can be played on said accordion.

3. In an accordion of the class described, the combination of a bass section having a front wall, a set of thirty-two keys arranged in said wall in two groups, two sets of clappers, two sets of double reeds of fundamental basses arranged chromatically from low C to B and controlled by the first set of clappers, three sets of double reeds controlled by the second set of clappers, and said keys being arranged in two groups, connections from one of said groups of keys for operating the second set of clappers and connections from the other group of said keys for operating simultaneously both sets of clappers.

4. In an accordion of the class described, the combination of a bass section having a front wall, a set of thirty-two keys disposed in said wall in a plurality of longitudinal and diagonal rows, said keys representing single notes arranged chromatically and being arranged in two groups, two sets of clappers, two sets of double reeds of fundamental basses arranged chromatically from low C to B and controlled by the first set of clappers, three sets of double reeds of chords arranged chromatically from "C" to high G above high C and controlled by the second set of clappers, operating connections between one group of keys and the second set of clappers whereby the three sets of double reeds are operated thereby, and operating connections between the second group of keys and both sets of clappers whereby all five sets of double reeds are operated.

5. In an accordion of the class described, a bass section comprising in combination, a front wall, a plurality of keys arranged in said wall and consisting of thirty-two chord keys and four repeat keys arranged in six longitudinal rows, said repeat keys being arranged adjacent to the ends of the last three rows of keys and being counterparts of the four keys at the opposite ends of the fourth and fifth rows, the three top rows representing chords and the last three rows representing basses, two sets of trays, each tray having a single row of chambers and double reeds therefor for producing fundamental basses ranging chromatically from low C to B, three sets of trays, each tray having a single row of chambers and double reeds therefor and producing chords ranging chromatically from C to high G above high C, two sets of clappers, one set controlling the fundamental bass reeds and the other the chord reeds, operating connections between said chord keys and said chord clappers, and operating connections between bass keys and both sets of clappers.

6. In a bass section for accordions, the combination of a front wall, a plurality of keys arranged therein and consisting of thirty-two keys arranged in two groups, a plurality of single reed trays arranged in two groups corresponding to said two groups of keys, one group consisting of low and middle octaves forming fundamental basses and the other group of high octave forming single notes of higher pitch for single note intervals and for forming chords, whereby any single note intervals can be fingered proficiently and any chord written can be played in several different positions, a set of clappers controlling each group of reed trays, a set of cranks pivotally and transversely mounted above each set of clappers, each crank having one arm extending horizontally forward and engaging the corresponding clapper and having the opposite arm extending upward, two sets of shift rods slidably and transversely mounted above said cranks, the keys of each group being fixed to the forward ends of the shift rods of the corresponding set, a horizontal and transverse pin fixed on each shift rod of one set of shift rods adjacent to the upward crank arm of the corresponding clapper of the high octave set of clappers, and a pair of horizontal and transverse pins fixed on each shift rod of the second set, one pin of each pair being disposed adjacent to the upward crank arm of the corresponding clapper of the high octave set and the other pin of said pair being disposed adjacent to the upward crank arm of the corresponding clapper of the low and middle octave set, whereby the operation of the shift rods of the second set operates the corresponding clappers of both the high octave and the low and middle octave sets.

7. In an accordion, a bass keyboard comprising a plurality of keys consisting of thirty-two keys arranged in three groups, one group of twelve keys representing the first octave being used for low fundamental basses, the second group of seven keys representing the middle octave being used to form chords and to help out low basses, and the third group of thirteen keys representing high octave and being used for chords and single note formation, said keys being so arranged in longitudinal and diagonal rows that any passage in music can be played or fingered without the necessity of fingering any two consecutive keys with the same finger, whereby a different finger is always available for the next key to be operated.

8. In an accordion, a bass section mechanism comprising a plurality of clappers, a pivotally mounted rod for each clapper having one end bent horizontally and forwardly and secured to a corresponding clapper and having the opposite end bent vertically and upwardly, longitudinally slidable rods disposed transversely of said pivotal rods, a key fixed to the outer end of each slidable rod, and a pin fixed to each slidable rod and extending transversely and horizontally therefrom in front of the vertical end of one of said pivotal rods, whereby by actuating one of said shift rods a corresponding clapper is raised.

9. In an accordion, a bass mechanism comprising a plurality of clappers arranged in two parallel rows, two sets of pivotal rods arranged above and rearward of said clappers, each pivotal rod having one end bent horizontally and forwardly and secured to the corresponding clapper and having the opposite end bent vertically upward, two sets of shift rods slidably mounted above and transversely of said pivotal rods, a key fixed to the outer end of each shift rod, a pin extending horizontally and transversely from each one of the first set of shift rods and engaging the vertical arms of the rear set of pivotal rods, whereby the rear set of clappers is operated, and a pair of spaced horizontally and transversely disposed pins extending from each one of the second set of shift rods, one pin of each pair engaging the vertical arm of the rear set of pivotal rods and the other pin engaging the vertical arm of the front set of pivotal rods, whereby both sets of clappers are actuated by the last-mentioned set of shift rods.

10. In an accordion, a bass mechanism comprising a plurality of clappers arranged in two parallel rows, two sets of pivotal rods arranged above and rearward of said clappers, each pivotal rod having one end bent horizontally and forwardly and sceured to the corresponding clapper and having the opposite end bent vertically upward, two sets of shift rods slidably mounted above and transversely of said pivotal rods, a key fixed to the outer end of each shift rod, a pin extending horizontally and transversely from each one of the first set of shift rods and engaging the vertical arms of the rear set of pivotal rods, whereby the rear set of clappers is operated, a pair of spaced horizontally and transversely disposed pins extending from each one of the second set of shift rods, one pin of each pair engaging the vertical arm of the rear set of pivotal rods and the other pin engaging the vertical arm of the front set of pivotal rods, whereby both sets of clappers are actuated by the last-mentioned set of shift rods, a set of slidable shift repeater rods arranged in spaced relation with the first two sets of shift rods, a repeater key on the outer end of each of said shift rods, a set of pivotal rods, each having both ends disposed vertically upward, one end of each of said last-mentioned rods being disposed adjacent to a corresponding repeater shift rod, the opposite end being disposed adjacent to a selected shift rod of said second set, a pin extending horizontally and transversely from each repeater shift rod and lying in front of the corresponding repeater pivotal rod for actuating the latter.

11. In a bass section for accordions, the combination of a fornt wall for said section, a plurality of keys arranged in said wall and consisting of thirty-two keys arranged in two groups, the first group consisting of twenty keys representing chords and the other group of twelve keys representing basses, two sets of clappers, one set controlling reeds of single notes of higher pitch for playing single note intervals and forming chords, the other set controlling reeds of fundamental basses only, operating connections between said chord keys and both sets of clappers, and operating connections between said bass keys and the bass clappers only.

MAX B. LUTTBEG.